(12) United States Patent
Fung

(10) Patent No.: US 7,748,889 B2
(45) Date of Patent: Jul. 6, 2010

(54) CULINARY UTENSIL

(75) Inventor: Kwok Onn Fung, GuangDong (CN)

(73) Assignee: Maxpat Trading & Marketing (Far East) Limited, Hong Kong (HK)

( * ) Notice: Subject to any disclaimer, the term of this patent is extended or adjusted under 35 U.S.C. 154(b) by 403 days.

(21) Appl. No.: 11/680,854

(22) Filed: Mar. 1, 2007

(65) Prior Publication Data

US 2007/0221772 A1    Sep. 27, 2007

(30) Foreign Application Priority Data

Mar. 23, 2006    (GB) ................................ 0605877.0

(51) Int. Cl.
*A47J 43/10*    (2006.01)
(52) U.S. Cl. ..................... 366/129; 416/70 R
(58) Field of Classification Search .............. 366/129, 366/343; 416/70 R
See application file for complete search history.

(56) References Cited

U.S. PATENT DOCUMENTS

| | | | | |
|---|---|---|---|---|
| 697,804 | A * | 4/1902 | Campbell | ................ 416/70 R |
| 1,116,988 | A * | 11/1914 | Burke | ........................ 99/497 |
| 1,134,170 | A * | 4/1915 | Washburn | ................ 416/70 R |
| 1,645,062 | A * | 10/1927 | Lambert | .................... 366/129 |
| 1,859,958 | A | 5/1932 | Cessna, Jr. | |
| 2,023,451 | A | 12/1935 | Vaughn | |
| 2,126,890 | A * | 8/1938 | Jensen | ........................ 366/129 |
| 2,836,402 | A * | 5/1958 | Barnes et al. | ............. 416/70 R |
| 6,206,561 | B1 | 3/2001 | Hefti | ........................ 366/129 |

FOREIGN PATENT DOCUMENTS

| | | |
|---|---|---|
| DE | 483 124 | 9/1929 |
| DE | 548839 | 4/1932 |
| FR | 2 646 765 | 11/1990 |
| GB | 764555 | 12/1956 |
| GB | 858648 | 1/1961 |
| GB | 926918 | 5/1963 |
| JP | 10-174660 | 6/1998 |

\* cited by examiner

*Primary Examiner*—David L Sorkin
(74) *Attorney, Agent, or Firm*—Ostrolenk Faber LLP

(57) ABSTRACT

There is provided a combination pastry blender and culinary whisk, comprising a handle portion at one end and a connecting region connecting the handle portion and a mixing region generally in the shape of an inverted dome, wherein the mixing region is principally formed of a wire bent to form a plurality of wires arranged adjacent to each other and defining a generally convex surface for pastry blending, the bent wire being stiff enough to withstand the stress and pressure whereby in a pastry blending operation the mixing region maintains the inverted dome shape, and the bent wire also being relatively thick to be able to press onto a pasty for blending thereof but without cutting therethrough.

18 Claims, 3 Drawing Sheets

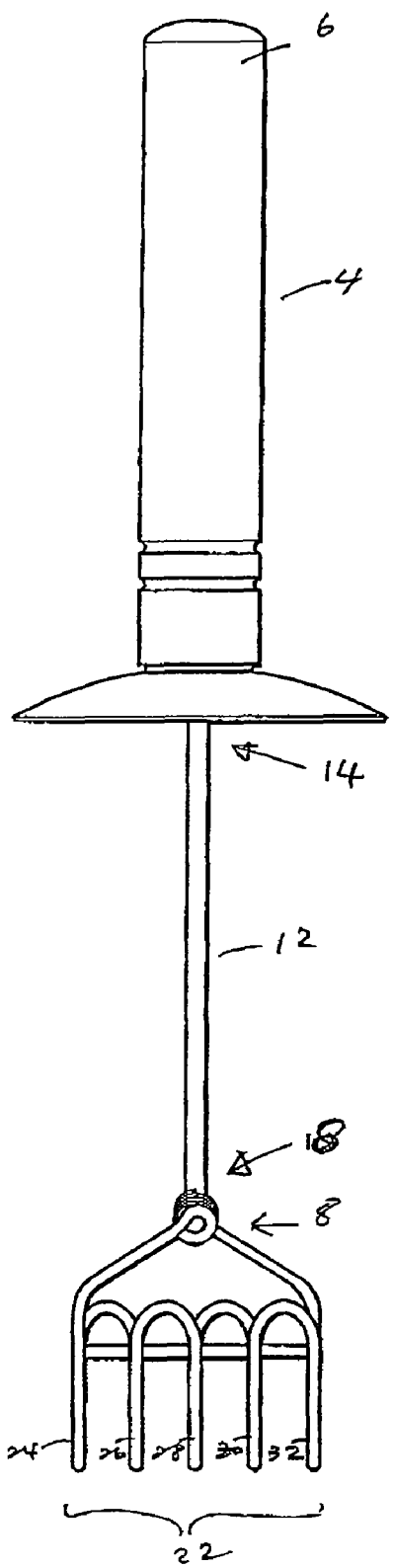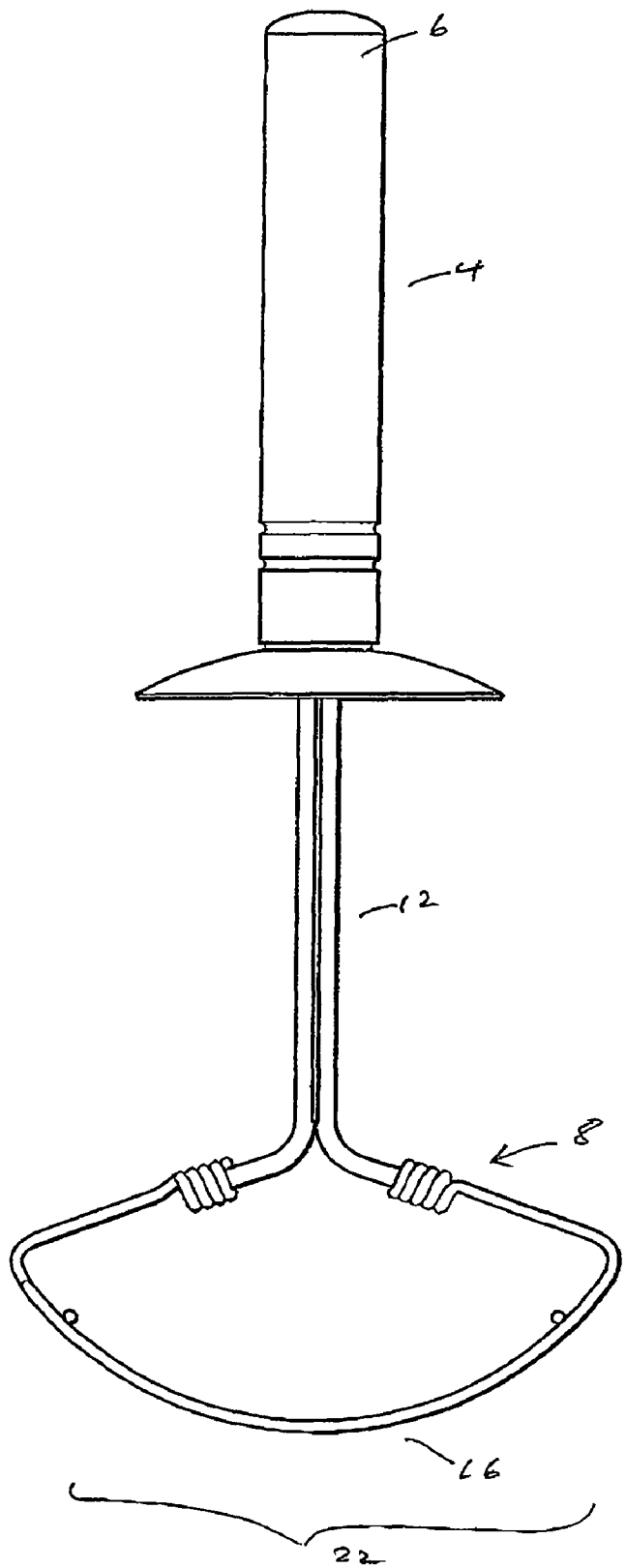

CULINARY UTENSIL

FIELD OF THE INVENTION

The present invention is concerned with a culinary utensil and in particular a culinary utensil with a dual function of blending pasty and whisking foodstuff.

BACKGROUND OF THE INVENTION

There are a variety of culinary utensil with different functions. However, each utensil is often designed to perform just one function and as a result a user would require a collection of many different utensil in a kitchen in order to address the different needs in food preparation. The present invention seeks to address this problem by providing a culinary utensil with a dual function, or at least to provide the public with a useful alternative.

SUMMARY OF THE INVENTION

According to a first aspect of the present invention, there is provided a culinary utensil, or more specifically a combination pastry blender and culinary whisk, comprising a handle portion at one end and a connecting region connecting the handle portion and a mixing region generally in the shape of an inverted dome, wherein the mixing region is principally formed of a wire bent to form a plurality of wires arranged adjacent to each other and defining a generally convex surface for pastry blending, the bent wire being stiff enough to withstand the stress and pressure whereby in a pastry blending operation said mixing region maintains the inverted dome shape, and the bent wire also being relatively thick to be able to press onto a pastry for blending thereof but without cutting therethrough. It is to be noted that conventional pastry blenders and culinary whisks typically possess characteristics which are mutually exclusive. The present invention is able to combine the characteristics of both pastry blenders and culinary whisks into a single dual-purpose culinary utensil.

Preferably, the convex surface for pastry blending may be defined by one bent wire. The construction of one wire is preferred for a number of reasons, including lower manufacturing cost in producing the mixing region, more durable mixing region due to the integral nature thereof and smoother of the convex surface defined by the bent wire. The bent wire defines a plurality of parallel lengths of the wire, all curved around a common horizontal axis and extending along the direction of the common axis.

Suitably, the bent wire may have a diameter from 1.25 mm to 3.25 mm. This dimension can ensure that in a pastry blending operation the bent wire is able to press onto a pastry which by its definition is relatively thick and generally in the form of a dough and yet it does not cut into the pastry or dough, while in a whisking operation the bent wire is thin enough to be efficient in mixing foodstuff and allowing foodstuff to pass thereby.

Advantageously, the handle portion may have an elongate profile provided with opposite ends, and the connecting region connecting only one end of the handle portion with the mixing region. Further, the length of the handle portion may be substantially half of the overall length of the combination. This configuration allows a user to hold on to the handle portion securely, and when needed the user may hold on to the handle with both hands allowing a more forceful blending of a pastry. Yet, this configuration also allows the utensil to reach into a container for whisking foodstuff.

Preferably, the handle portion may be provided with a finger guard arranged at a front end thereof. The finger guard is useful for example in preventing the slipping of the hand to the pastry being blended.

Suitably, the surface of the mixing region may be generally rectangular in shape, with opposite ends thereof upwardly curved defining the convex surface. The rectangular-shaped surface is relatively large for facilitating the pressing onto a pastry during pastry blending. The mixing region may generally be boat-shaped or inverted dome shaped. It is to be understood that due to the convex surface in a pastry blending operation the utensil is pressed downwardly on a pastry and is allowed to rock from side to side.

Advantageously, ends of the bent wire forming the mixing region may converge at or towards the connecting region, and is located away from the handle portion separated by the connecting region. The connecting region may be formed of two wires closely arranged or abutting each other in parallel. This construction allows a more efficient and forceful action on a pastry during pastry blending, and at the same time allows a swifter whisking action than if the connecting region were spread apart.

Preferably, the mixing region may be provided with means for reinforcing the structure thereof for maintaining the shape thereof despite pressure subjected thereto in a pastry blending operation. The reinforcement means may be in the form of a rib or ribs secured to the a surface opposite to the convex surface of the mixing region.

Suitably, the ratio of the width or the longer side of said mixing region and the overall length of said combination may be from about 1:2 to 2:5. Studies have shown that this general profile allows the utensil to perform the function of a pastry blender and a culinary whisk.

According to a second aspect of the present invention, there is provided a culinary utensil for mixing foodstuff and generally defining a longitudinal axis, comprising a handle portion at one end, a utility portion at the opposite end and extending from the handle portion, wherein the handle portion defines a longitudinal axis generally overlapping or in parallel with the longitudinal axis of the utensil, and wherein the utility portion includes a mixing region formed of one or more relatively stiff wires bent to define a generally inverted dome-shaped structure for blending pastry and whisking foodstuff. This particular configuration of the handle portion and the utility portion may assist a user to blend pastry or whisk foodstuff with the same utensil. In particular, the dome-shaped structure provides a curved surface roughly corresponding to the internal curvature of a mixing bowl or container in which, for example, foodstuff to be whisked is located. Further, the curved surface may assist reciprocating sideway movement of the utensil for blending a pastry or dough. Preferably, the handle may generally be an elongate handle or in the form of a tube handle.

Suitably, the utility portion may include a connecting region connecting only one end of the handle portion with one end of the mixing region. This arrangement of the handle portion, the connecting region and the utility portion may allow the front end of the handle to connect to the connecting region and the rear end pointing towards the user in use. Further, this arrangement may facilitate the reciprocating movement in blending pastry, and also the reciprocating whisking movement in a whisking operation.

Advantageously, the utility portion or the mixing region may be made of one bent wire bent to define a plurality of wires. The use of only one bent wire may enhance the integrity and sturdiness of the utility portion. It may also enhance the manufacturing efficiency of the utensil. Alternatively, the mixing region may be made of one bent wire, and preferably one or more reinforcing wires are included to improve the sturdiness of the mixing region.

Preferably, the connecting region may be formed of two wires closely arranged or abutting each other in parallel. This arrangement increases the strength of the connecting region which often is subjected to considerable pressure and stress in use.

Suitably, the utensil may be provided with a finger guard arranged at the front end of the handle portion.

Specifically, the utensil may be a pastry blender or a culinary whisk, or may have a dual function of a combination pastry blender and culinary whisk.

Advantageously, the length of the handle portion may be substantially half of the overall length of the utensil, or the longitudinal length of the utility portion may be substantially half of the overall length of the utensil. The ratio of a width of the mixing region and the overall length of the utensil may be from about 1:2 to 2:5. These ratios will allow the utensil to perform as a culinary whisk which, in order to perform a whisking function, requires the handle to be relatively long in relation to the overall length of the utensil.

According to a third aspect of the present invention, there is provided a combination utensil of pastry blender and culinary whisk, comprising a handle portion at one end, a utility portion at the opposite end, and a connecting region connecting the handle portion and a mixing region of the utility portion, wherein the mixing region is formed of one or more relatively stiff wires bent to define a convex surface for blending pastry, and wherein the connecting region connects only one end of the handle portion with only one end of the mixing region.

Preferably, the utensil may be of generally elongate shape generally defining a longitudinal axis, wherein the handle portion defines a longitudinal axis generally overlapping or in parallel with the longitudinal axis of the utensil.

Suitably, the mixing region generally may have a shape of an invented dome providing the convex surface for engagement with foodstuff.

Advantageously, the utility region and/or the mixing region may essentially be made of one bent wire. Alternatively, the convex surface of the dome may be defined by five wires arranged in parallel, although the number of wires defining the surface may range from four to seven.

The connecting region may be formed of two wires closely arranged or abutting each other.

Preferably, the utensil may comprise a finger guard arranged at a front end of the handle.

Suitably, the longitudinal length of the handle portion may be substantially half of the longitudinal length of the utensil. The longitudinal length of the utility portion may be substantially half of the longitudinal length of the utensil. The ratio of a width of the mixing region and the longitudinal length of the utensil may be from about 1:2 to 2:5.

BRIEF DESCRIPTION OF THE DRAWINGS

An embodiment of the invention is described, by way of example only, with reference to the following drawings in which:

FIGS. 3 and 4 are side views of the utensil.

DETAILED DESCRIPTION OF A PREFERRED EMBODIMENT

Figure 1:
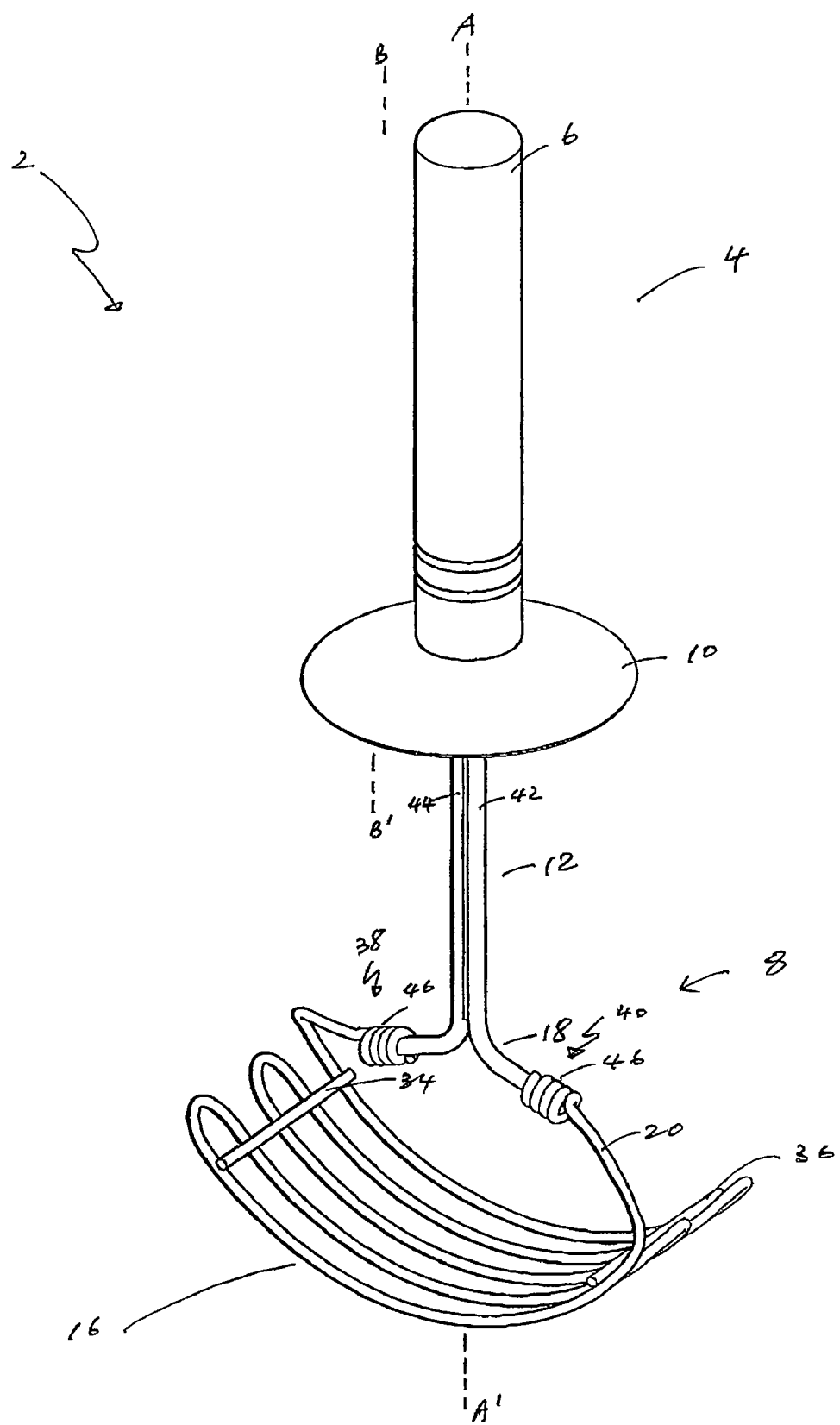
FIG. 1 is a perspective view of an embodiment of a culinary utensil in accordance with the present invention.
Figure 2:
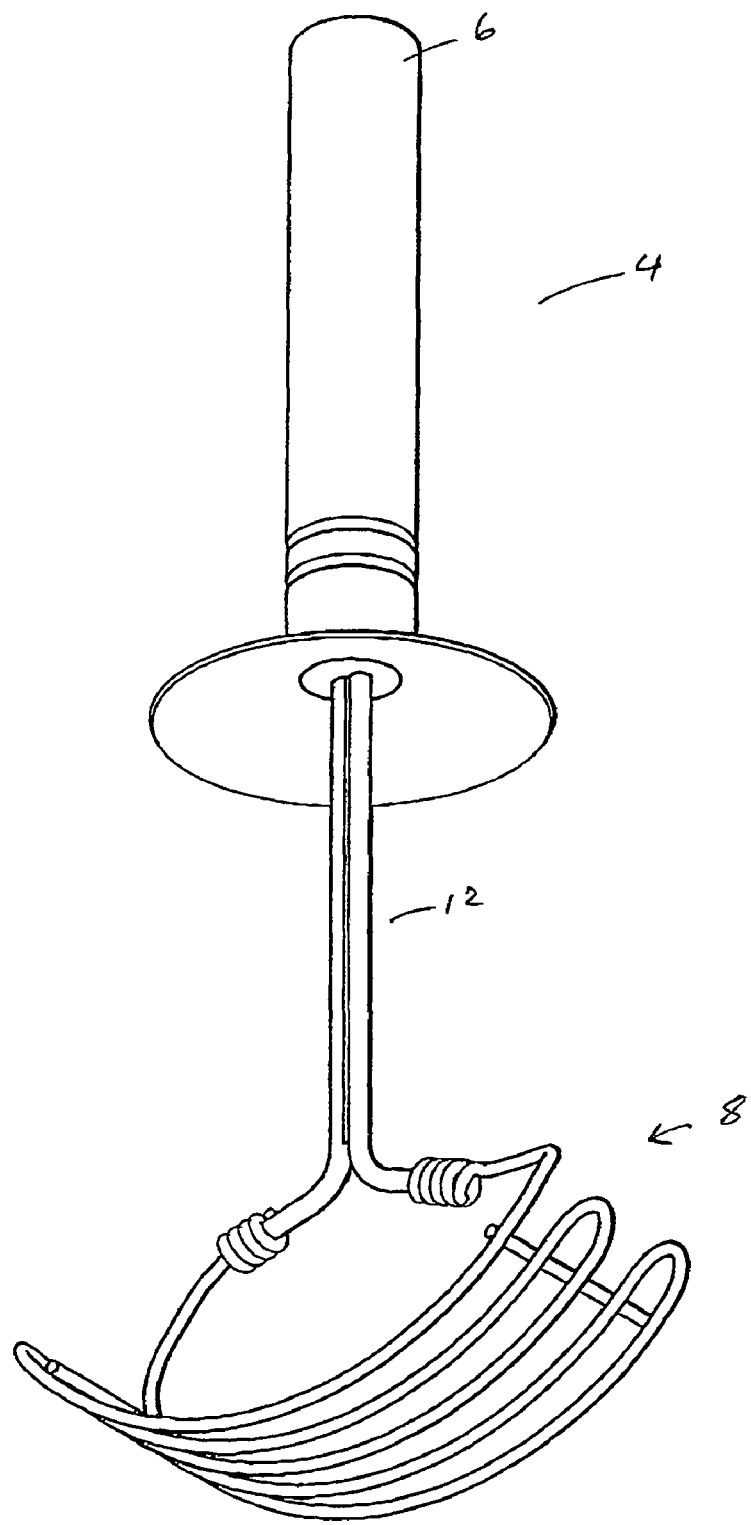
FIG. 2 is an alternative perspective view of the utensil.

An embodiment of a culinary utensil according to the present invention is shown in FIGS. 1 to 6, and generally designated as 2. Referring to FIGS. 1 and 2 first, there is shown a culinary utensil 2 comprising a rear portion 4 in the form of a tube handle 6 (or an elongate handle) and a front portion 8 for mixing or blending foodstuff. A finger guard 10 in the form of a circumferential flange arranged adjacent a connecting region 12 extends transversely at the front end of the handle 6. It is shown that the utensil 2 has an elongate profile which defines a longitudinal axis A-A' that runs from the rear portion 4 to the front portion 8 of the utensil 2. The handle 6 also has an elongate profile which generally defines a longitudinal axis B-B' thereof. The utensil 2 is provided with the connecting region 12 with one end 14 joining to the front portion 8 of the handle 6 and the other end 18 joining to the mixing portion 8.

The mixing portion 8 has a distinct mixing region generally in the shape of an inverted dome structure 16 connected to the other end 18 of the connecting region 12, as shown in FIG. 3. The mixing region 8 is principally made of a relatively stiff stainless steel wire 20. The wire 20 is springy enough to flex slightly in a whisking operation but also stiff enough to withstand the stress and pressure in a pastry blending operation. The wire 20 is also relatively thick to be able to press onto a pastry for blending thereof but without cutting therethrough. The dome structure 16 provides a convex surface 22 for use in blending a pastry or a dough and particularly for pressing on the pastry or the dough in use. The convex surface 22 is roughly a rectangular surface with opposite sides upwardly bent towards the handle 6. The surface 22 is defined by a plurality of parallel wires 24, 26, 28, 30, 32 which is formed by bending the steel wire 20 to such a configuration. Those parallel wires are also all curved around a common axis and all wires of the plurality have the same curvature. To increase the strength and sturdiness of the mixing region 8, two ribs 34, 36 are provided at opposite ends across the width of the mixing region. In particular, each of the two ribs is arranged substantially perpendicularly to the parallel wires 24, 26, 28, 30, 32 ad is welded thereto.

The steel wire 20 forming the mixing portion has two free ends 38, 40, each of which is coiled to form a female member 46. The connecting region 8 is formed of two relatively thick, or thinker, wires 42, 44 arranged in parallel and are fixedly joined together. As indicated above, the rear end of the connecting region 14 is joined to the front end of the handle 6. The front end of the two thicker wires 42, 44 folks off and forms two male members, each of which is received within and fixedly secured to the respective female member 46 of the mixing region 8.

In this embodiment, each of the wires 42, 44 in the connecting region 12 is substantially 3.16 mm in diameter. With the use of two such wires arranged in parallel as described above, the connecting region 12 is able to withstand relatively high stress and pressure sustained particularly when the utensil is used as a pastry blender. Nevertheless, it is envisaged that the connecting region may be designed slightly differently. For example, instead of using two wires arranged in parallel, only one wire or more than one wire could be used. If one wire were to be used, then the only wire would have to be greater in diameter to withstand the stress. If more than two wires were to be used, then the diameter of the wires could be decreased accordingly. Studies have found that when two wires are used (as in the embodiment described above), the diameter of the wires may range from 2 mm to 4 mm.

The wire 20 in the mixing region 8 in this embodiment is substantially 2 mm in diameter. The wire 20 is different from typical wires or wire loops in the mixing region of a conventional culinary whisk which is typically much smaller (e.g. about 1 mm) in diameter. The use of such a thicker wire ensures that the mixing region can not only be used for whisking typical foodstuff, it can also withstand the pressure and maintain a generally firm or rigid structure when the mixing region is used to press on a pastry or dough and is rocked from side to side against the pastry or dough in a pastry blending operation. Studies have found that the diameter of the wire may however range from 1.25 mm to 3.25 mm. It is to be noted that unlike many typical utensil for pastry blending only in which the mixing region is formed of strips of thin and elongate metallic members, the utensil 2 in accordance with this invention uses relatively thick and resilient stainless steel wires forming a curved surface for blending a pastry or a dough. The use of such steel wires and the provision of a longitudinally arranged handle spaced apart from the mixing region allow the combined and improved performance of pastry blending and foodstuff whisking.

As shown in FIG. 1, the longitudinal axis B-B' of the elongate handle 6 generally overlaps (or at least is arranged substantially in parallel with) the longitudinal axis A-A' of the utensil 2 which is provided with the finger guard 10. When the utensil 2 is used as a pastry blender, a user may hold on to the utensil 2 at the handle 6 closer to the finger guard 10 because in a pastry blending operation, it would require a stronger forward or downward force pressing on the pastry or dough and reciprocating rocking the utensil from side to side. The provision of the finger guard 10 prevents the hand from slipping towards the mixing region 8 and towards the pastry or dough. On the other hand, when the utensil 2 is used as a culinary whisk, the user may hold on to the utensil 2 towards the rear end of the handle 6 because in a whisking operation, it would require larger swinging motion of the mixing region.

In this embodiment the length of the handle or the length of front portion is about half of the length of the utensil. This approximate proportion is well balanced to allow the utensil to act as a combination pastry blender and culinary whisk. Further, the ratio of the width of the mixing region and the overall length is about 4:9, although studies conducted during the course of arriving at the present invention have found that it may be from about 1:2 to 2:5 and the performance would still be satisfactory.

It is appreciated that a variety of other slight improvements, variations or modifications may be incorporated to the above embodiment or to the present invention without deviating from the inventive concept thereof.

The invention claimed is:

1. A combination pastry blender and culinary whisk, comprising:
    a handle portion at one end of said whisk;
    a mixing region at an opposite end of said whisk; and
    a connecting region connecting said handle portion and said mixing region;
    said mixing region being generally in the shape of an inverted dome curved around a common axis;
    said mixing region being principally formed of one wire bent to form a plurality of parallel wires arranged near to each other, each said wire of said plurality of wires extending along a direction of said common axis and said plurality of wires being in an array around said axis, and said plurality of parallel wires together defining a generally convex surface for pastry blending, said bent wire being stiff enough to withstand stress and pressure, whereby in a pastry blending operation, said mixing region maintains the inverted dome shape, and
    said bent wire also being relatively thick to be able to press onto a pastry for blending thereof but without cutting therethrough; and
    said one bent wire having two free ends, each said free end being bent to converge toward said other free end from a respective opposite side of said mixing region said free ends of said one bent wire connecting to said connecting region, and
    said connecting region comprising two connecting region wires, one connecting region wire extending from each said free end of said one bent wire, said connecting region wires converging toward each other, and said two converged connecting region wires extending together a distance toward said handle portion and then being connected to said handle portion.

2. A combination pastry blender and culinary whisk as claimed in claim 1, wherein said one bent wire has a diameter from 1.25 mm to 3.25 mm.

3. A combination pastry blender and culinary whisk as claimed in claim 1 wherein said handle portion has an elongate profile provided with opposite ends, and said connecting region connecting only one said end of said handle portion with said mixing region.

4. A combination pastry blender and culinary whisk as claimed in claim 1, wherein said handle portion has a length substantially half of an overall length of said combination.

5. A combination pastry blender and culinary whisk as claimed in claim 1, further comprising a finger guard arranged at a front end of said handle portion.

6. A combination pastry blender and culinary whisk as claimed in claim 1, wherein said convex surface is generally rectangular in shape.

7. A combination pastry blender and culinary whisk as claimed in claim 1, wherein said free ends of said one bent wire are spaced away from said handle portion and said free ends are connected to said handle portion by said connecting region comprised of said connecting region wires that have converged.

8. A combination pastry blender and culinary whisk as claimed in claim 7, wherein said connecting region wires of said connecting portion are of a great thickness than said one bent wire of said mixing region.

9. A combination pastry blender and culinary whisk as claimed in claim 8, further comprising a respective connection between each said free end of said one bent wire and an end of one of said connecting region wires.

10. A combination pastry blender and culinary whisk as claimed in claim 9, wherein said connecting region wires converge together and extend in contact with each other along said connecting region.

11. A combination pastry blender and culinary whisk as claimed in claim 1, wherein said connecting region is formed of two said connecting region wires closely arranged or abutting each other and extending in parallel.

12. A combination pastry blender and culinary whisk as claimed in claim 11, wherein said connecting region wires converge together and extend in contact with each other along said connecting region.

13. A combination pastry blender and culinary whisk as claimed in claim 1, wherein said mixing region is generally of a boat-shape.

14. A combination pastry blender and culinary whisk as claimed in claim 1, further comprising a reinforcement extending across said plurality of wires of said mixing region for reinforcing said mixing region for maintaining a shape thereof despite subjecting said mixing region to pressure in a pastry blending operation.

15. A combination pastry blender and culinary whisk as claimed in claim 14, wherein said reinforcement comprises a rib extending across said plurality of wires of said mixing region and attached to said plurality of wires.

16. A combination pastry blender and culinary whisk as claimed in claim 1, wherein the ratio of a width or longer side of said mixing region and an overall length of said combination is from about 1:2 to 2:5.

17. A combination pastry blender and culinary whisk as claimed in claim 1, further comprising:
    said handle portion has an elongate profile provided with opposite ends, and said connecting region connecting only one end of said handle portion with said mixing region.

18. A combination pastry blender and culinary whisk as claimed in claim 17, wherein said handle portion has a length substantially half of an overall length of said combination.

\* \* \* \* \*